Aug. 30, 1938.   E. B. THOMPSON   2,128,441
MOTOR FOR OPERATING A VIBRATORY JACK
Filed Feb. 25, 1935   2 Sheets-Sheet 1
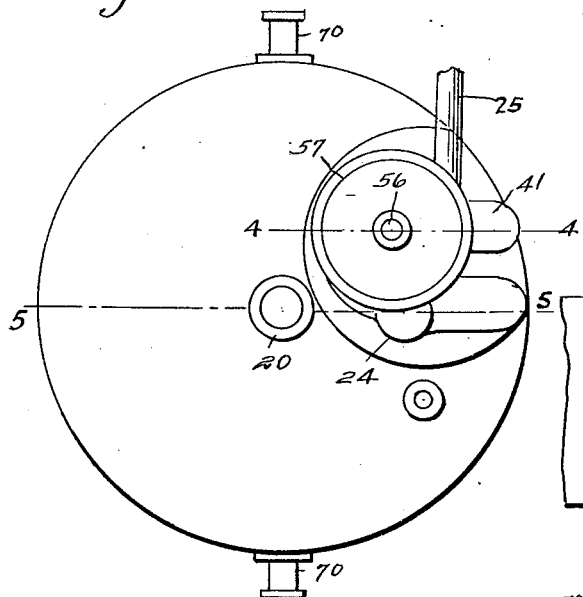
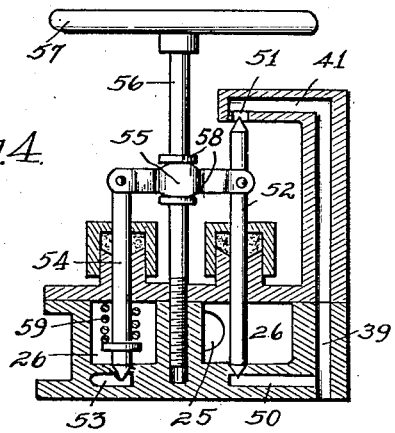
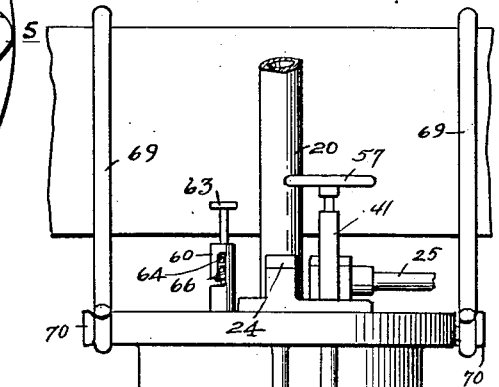
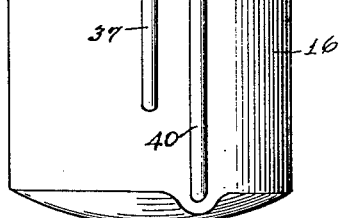
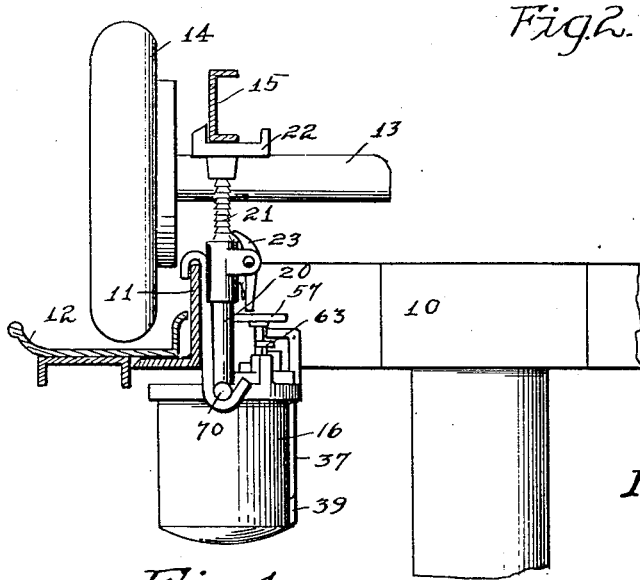
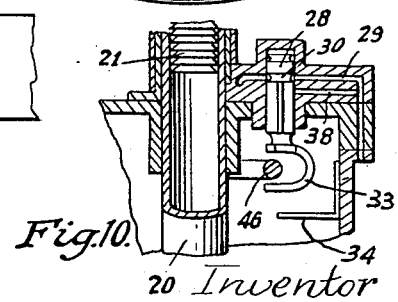
Inventor
Elmer B. Thompson Aug. 30, 1938. E. B. THOMPSON 2,128,441
MOTOR FOR OPERATING A VIBRATORY JACK
Filed Feb. 25, 1935   2 Sheets-Sheet 2
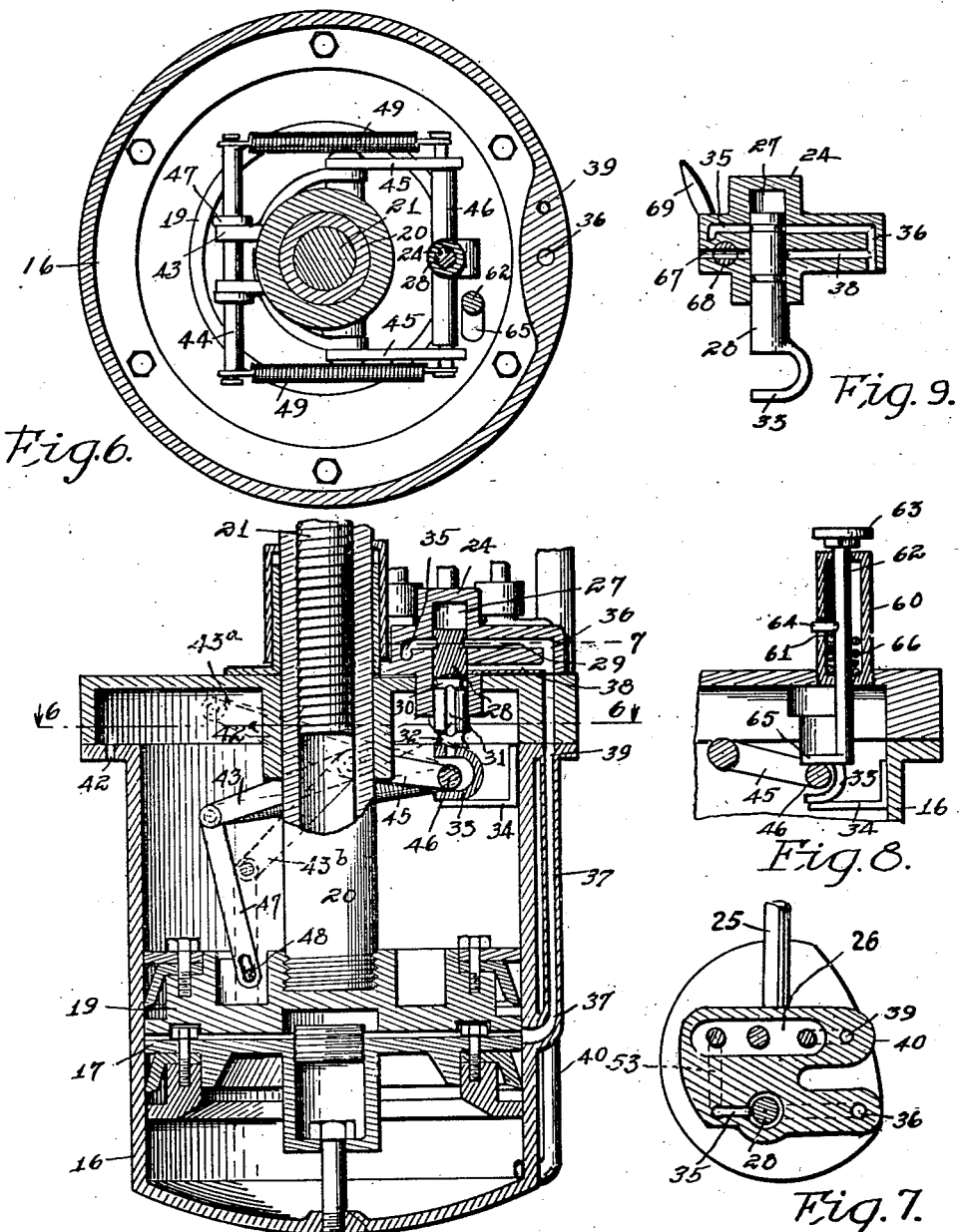
Inventor
Elmer B. Thompson Patented Aug. 30, 1938

2,128,441

UNITED STATES PATENT OFFICE

2,128,441

MOTOR FOR OPERATING A VIBRATORY JACK

Elmer B. Thompson, Des Moines, Iowa, assignor to Globe Machinery & Supply Company, Des Moines, Iowa, a corporation of Iowa Application February 25, 1935, Serial No. 7,995

2 Claims. (Cl. 121—164)

My invention relates to that class of vibrating automobile jacks illustrated in my application for patent filed December 15, 1933, Serial Number 702,508, and upon which application Patent No. 2,054,550 has been issued, and my object is generally to provide an improved jack of the class therein disclosed.

A further object is to provide in a vibratory jack means of simple, durable and inexpensive construction, whereby the operator may, by manipulating a latch device, cause the vibrating movement to discontinue and hold the jack in its elevated position, and whereby an operator may more conveniently and easily grease the springs and shackles of an automobile on the lift when the springs are in their expanded position and the shackles are relieved of pressure and free to be moved to position for readily and easily receiving grease.

A further object is to provide means of simple, durable and inexpensive construction for automatically actuating the valve which admits and exhausts fluid pressure from the cylinder for the purpose of vibrating the piston, and more specifically in this connection to provide a valve controlling means of this character which will operate to vibrate the jack only during a certain portion of the piston movement and which will permit the piston to move freely within the cylinder through the lower part of the cylinder without affecting the automatic vibratory controlling valve so that the jack may be moved upwardly a slight distance to engage an automobile frame, and downwardly a slight distance to release it from an automobile frame without operating the vibratory valve.

A further object is to provide a manually controlled valve of simple, durable and inexpensive construction for controlling the admissions and exhaust of fluid pressure to the vibratory valve and which, when in one position, permits the flow of fluid pressure to the space below the lower piston, and when in another position, permits the fluid pressure to flow to the vibratory valve, and in a third position permits the fluid pressure to exhaust from beneath both pistons to thereby lower the jack and release it from the automobile frame.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows an end elevation, partly in section, of an automobile lift, and a portion of an automobile thereon, and my improved vibratory jack in position supported by the lift and engaging the automobile frame.

Figure 2 shows a side elevation of my improved vibratory jack suspended from a portion of an automobile lift frame.

Figure 3 shows a top or plan view of my improved vibratory jack.

Figure 4 shows an enlarged detail vertical sectional view taken on the line 4—4 of Figure 3 and illustrating the manually controlled valve device for controlling the admission of fluid pressure to the jack.

Figure 5 shows an enlarged vertical central sectional view through the cylinder and piston portions, and the vibratory valve portion of my device taken on the line 5—5 of Figure 3.

Figure 6 shows a horizontal sectional view taken on the line 6—6 of Figure 5.

Figure 7 shows a detailed horizontal sectional view taken on the line 7 of Figure 5.

Figure 8 shows a detail vertical sectional view illustrating the manually controlled member for holding the vibratory valve mechanism in an inoperative position; and Figure 9 shows a similar view illustrating a modification.

Figure 10 is a segmental portion of Figure 5 illustrating the control valve in its exhaust position.

Referring to the accompanying drawings I have used the reference numeral 10 to indicate generally an automobile lift having a longitudinally arranged angle bar member 11 and a wheel supporting trough 12. I have also used the reference numeral 13 to indicate generally an automobile axle, 14 an automobile wheel and 15 a portion of an automobile frame to which my improved jack device is to be applied.

My improved vibratory jack device comprises a cylinder 16, and on the interior of this cylinder is a lower piston 17, the upward movement of which within the cylinder is limited by a bolt 18.

In the space within the cylinder above the lower piston 17 is an upper piston 19 connected to a hollow piston rod 20, and adjustably mounted in this hollow piston rod 20 is an upright shaft 21 having an automobile frame engaging member 22 at its top. The exterior of said shaft 21 is provided with ratchet teeth, and a spring actuated pawl 23 is carried by the piston rod 20 to engage said ratchet toothed shaft 21.

At the top of the cylinder I have provided a valve chamber indicated generally by the reference numeral 24, into which there is admitted a pipe 25 for the admission of fluid under pressure. Within this valve chamber there is an enlarged chamber 26 in communication with the pipe 25, and also a valve chamber 27 which communicates indirectly with the fluid pressure supply pipe 25, as hereinafter more fully explained.

Within the valve chamber 27 is an upright slide valve 28 having an annular groove at 29 near its upper end, and a second annular groove 30 near its lower end. This annular groove 30 communicates with an upright passageway 31 leading to a third annular groove 32 near the lower end of the valve, and at the lower end of the valve is a hooked arm 33 for purposes hereinafter made clear. Fixed to the interior of the cylinder is a bracket 34 for limiting the downward movement of the valve.

Within the valve casing there is a passageway 35 leading to the valve chamber 27, and on the side of the valve chamber 27 opposite the passageway 35 there is a passageway 36 which leads downwardly through a tube 37 to the space within the cylinder below the upper piston. Communicating with the upper end of this tube 37 is an exhaust passageway 38 leading to the valve chamber 27.

Leading from the enlarged chamber 26 is a passageway 39, shown in Figure 7, communicating with the tube 40 and leading to the space beneath the lower piston. At its upper end this passageway 39 communicates with an exhaust passageway 41 illustrated in Figure 4 and hereinafter more fully described.

The arrangement of these fluid pressure passageways is such that when the valve 28 is in the position shown in Figure 5, then fluid pressure may pass through the passageway 35 around the valve 28, and through the passageway 37 to the space beneath the upper piston, and when this is done the piston is elevated. When the piston has been elevated means are provided, hereinafter explained, by which the valve 28 will be raised, and when thus raised its annular groove 30 will be in position in line with the passageway 36, and fluid pressure from beneath the upper piston may be exhausted through said passageway 36 and the passageway 31 to the upper part of the cylinder, from which it may be exhausted through the exhaust port 42.

My improved means for automatically actuating the valve 28 is shown in Figures 5 and 6 and comprises a pair of arms 43 pivoted to the cylinder flange 42a and extended laterally within the cylinder where they are connected to a horizontally arranged shaft 44. Two additional arms 45 are pivotally connected to the said cylinder flange in line with the pivotal connection of the arms 43, and they extend upwardly within the cylinder and are connected at their outer ends by a shaft 46.

A link 47 is pivoted to the shaft 44, and extends downwardly and has a limited sliding connection at 48 with the upper piston, as shown in Figure 5, and two contractual coil springs 49 are connected to the shafts 46 and 44. The said shaft 46 lies within the hook shaped portion 33 of the lower end of the slide valve 28.

The operation of this slide valve controlling mechanism is as follows:

Assuming that the parts are in the position shown by solid lines in Figure 5, then the springs 49 hold the arms 43 and 45 to their downward limits of movement, as shown in said figure, and they hold the valve 28 at its downward limit, and in this position the valve 28 is in position to admit fluid pressure to the space beneath the upper piston. When this has been done the upper piston rises, and when the arms 43 reach the position shown by dotted lines at 43a, Figure 5, the springs 49 will have passed a dead center relative to the pivotal point of the arms 43 and 45, and then the springs will move the arms 45 upwardly, as shown by dotted lines in Figure 5, and thereby elevate the valve 28. When in this position the valve 28 is in position for exhausting fluid pressure from the space below the upper piston, and when this fluid pressure is exhausted, the upper piston will move downwardly by gravity, and when the arms 43 have moved downwardly to a certain extent, the springs 49 will snap the arms 45 downwardly to again open the valve 28. In this connection attention is directed to the fact that with this construction the arms 43 are free to move downwardly to the position shown by dotted lines in Figure 5, at 43b, so that the upper piston may move downwardly to its lower limit without affecting the operation of the valve 28.

For the purpose of manually controlling the admission and exhaust of fluid pressure to the valve chamber 27, I have provided the valve chamber 26 which communicates with the supply pipe 25, as shown in Figure 4. Within this valve chamber 26 there is a valve seat at the bottom of the chamber communicating with the passageway 50 leading to the passageway 39 which communicates with the interior of the cylinder below the lower piston, and at the upper end of the valve chamber 26 is the passageway 41 having a valve seat and opening 51 which serves as an exhaust.

Slidingly mounted between these two valve seats is a valve stem 52 having a valve at each end. At the other side of the valve chamber 26 there is a valve seat and passageway leading to the passageway 53 shown in Figure 4, which communicates with the passageway 35 leading to the valve chamber 27 as shown by dotted lines in Figure 7.

Mounted within the valve chamber 26 is a second valve stem 54 with a valve at its lower end to control the passageway to the passageway 53. The upper end of this valve stem 54 is pivotally connected to a lever 55, which lever is mounted upon a screw threaded shaft 56 having a hand wheel 57 at its upper end. This shaft is seated in a screw threaded opening on top of the cylinder, and may be raised and lowered by hand. On this screw threaded shaft 56 are two circular lugs 58, shown in Figure 4, which serve as a fulcrum for the lever 55. This lever is pivoted at its ends to the valve stems 54 and 52.

An extensile coil spring 59 is provided to exert downward pressure upon the valve stem 54.

The operation of this portion of the device is as follows:

When the shaft 56 is in the position shown in Figure 4, then the passageway for fluid pressure to the space beneath the lower piston is closed and the exhaust through the opening 51 from the space beneath the lower piston is open. Also the passageway 53 leading to the valve chamber 27 is closed. When the shaft 56 is moved upwardly a slight distance, then the lever 55 is fulcrumed at its end that is connected to the valve stem 54, which is held down by the spring 59, and the valve stem 52 is raised to close the exhaust port 51 and open the valve at the lower end leading to the passageway 50 for admitting fluid pressure to the bottom of the cylinder below the lower piston, and this provides for the raising of the lower piston to its upper limit and there holding it, and by this means the upper end of the jack is brought into firm engagement with and partly elevates the automobile frame 15 or other weight to which it is to be applied. When this has been done, a further elevation of the screw threaded shaft 56 causes the pivotal point of the lever 55 with the valve stem 52 to serve as a fulcrum, and then the valve stem 54 is raised against the pressure of the spring 59 to thereby open the passageway from the chamber 26 to the passageway 53, thereby admitting fluid pressure to the valve chamber 27 and causing the valve 28 to be vibrated in the manner before described. A lowering movement of the shaft 56 first closes the passageway leading to the vibrating valve chamber and later closes the valve controlling the fluid pressure admission to the space below the lower piston and opening the exhaust for said space.

To provide for holding the jack at its upward limit of movement I have provided the following mechanism illustrated in detail in Figure 8 and shown in elevation in Figure 2.

Mounted upon the top of the cylinder is a hollow cylindrical support 60 provided on one side with an upright slot, shown in Figure 2, and at the lower end of the upright slot there is a laterally extended slot 61. Slidingly mounted within the member 60 is a shaft 62 having a knob 63 at its upper end and having a pin 64 extended through the slot 61. At its lower end the shaft 62 is provided with a laterally extending member 65, and within the member 60 is an extensile coil spring 66 to normally bear upwardly upon the pin 64 and to normally hold the shaft 62 at its upper limit of movement. In practice this shaft 62 and its member 65 are normally held at their upper limit by the spring 66. Then when it is desired to hold the upper piston at its upper limit of movement the operator presses downwardly upon the knob 63 and then twists it laterally, bringing the pin 64 into the slot 61, and when in this position the member 65 projects over the rod 46 and thereby holds said rod at its lower limit of movement. This holds the valve 28 in the position shown in Figure 5, and when in that position fluid pressure is maintained through the passageway 37 into the space below the upper piston.

In Figure 9 I have illustrated a modified form of device for normally holding the upper piston in its elevated position, and this modification includes an exhaust passageway 67 leading from the valve chamber 27 in line with the exhaust passageway 38, and in this exhaust passageway 67 I have provided a valve 68, of ordinary construction, provided with a handle 69, and when this valve is in open position, as shown in Figure 9, then when the slide valve 28 is at its upper limit of movement the fluid pressure may be exhausted through this valve 68. However, when the valve 68 is closed, the fluid pressure beneath the upper piston cannot exhaust and, hence, the upper piston is held in its elevated position.

For supporting my improved jack device upon an automobile frame I have provided two hooked hangers 69 designed to engage the trunnions 70 on the cylinder and to hook over the top of the angle bar 11 of an automobile lift.

In practical operation I apply my improved jack device to an automobile lift at any point throughout the length of the lift desired by means of the hooked hangers 69. Then the member 22 of the jack is manually elevated until it loosely engages, or stands close to, the under surface of the automobile frame being serviced. This obviously may be done readily and easily. Then the operator manipulates the hand wheel 57 a slight distance until it raises the valve stem 52, which admits fluid pressure to the passageway 50, shown in Figure 4, the passageway 39, shown in Figure 7, and the tube 40, shown in Figure 5, to the space below the bottom of the lower piston, and the lower piston is then raised to its upper limit and thereby the automobile frame is elevated above the lift a distance according to the length of travel of the lower piston, as shown in Figure 1. Then, if it is desired to vibrate the automobile frame for spring and shackle servicing purposes, the operator further manipulates the hand wheel 57 and opens the valve 54. This permits the passage of fluid pressure through the passageway 53 shown in Figure 4 and through the passageway 35 and into the valve chamber 27, as shown in Figure 5, and this causes the upper piston to be vibrated through its controlling mechanism before described, and during this vibration the springs and shackles of the car being serviced may be efficiently and thoroughly greased or serviced.

In the event that it is desired to hold the jack at its upper limit of movement with the automobile springs and shackles in their loosened condition, the operator manipulates the knob 63, shown in Figure 8, as hereinbefore described, and thereby automatically holds the upper piston and the jack in its elevated position in the manner specifically described, and when the automobile has been serviced the knob 63 is turned to position for releasing the shaft 46, the hand wheel 57 is returned to the position shown in Figure 4, and the fluid pressure is thereby permitted to exhaust from the space beneath both pistons so that the jack is fully lowered.

I claim as my invention:

1. A device of the class described, comprising a cylinder, two independently movable pistons within the cylinder, means for limiting the upward movement of the lower piston for confining such movement to a definite path of travel at the lower portion of the cylinder, the upper piston being capable of movement downwardly in the cylinder below the position assumed by the lower piston when the lower piston is elevated, a weight-engaging means operatively connected with the upper piston, a valve for admitting and exhausting fluid pressure to and from the space between the pistons, a valve-actuating mechanism operatively connected with the upper piston and with the valve for automatically operating the valve by the up and down movements of the upper piston, said valve-operating mechanism including means whereby when the lower piston is in its lowered position the upper piston may move downwardly into the space occupied by the lower piston when elevated, and means for admitting fluid under pressure below the lower piston for raising the lower piston and for causing the lower piston to elevate the upper piston.

2. A device of the class described, comprising a cylinder, two independently movable pistons within the cylinder, means for limiting the upward movement of the lower piston for confining such movement to a definite path of travel at the lower portion of the cylinder, the upper piston being capable of movement downwardly in the cylinder below the position assumed by the lower piston when the lower piston is elevated, a weight-engaging means operatively connected with the upper piston, a valve for admitting and exhausting fluid pressure to and from the space between the pistons, a valve-actuating mechanism operatively connected with the upper piston and with the valve for automatically operating the valve by the up and down movements of the upper piston, said valve-operating mechanism including means whereby when the lower piston is in its lowered position the upper piston may move downwardly into the space occupied by the lower piston when elevated, means for admitting fluid under pressure below the lower piston for raising the lower piston and for causing the lower piston to elevate the upper piston, and manually operable means for holding said valve in position for maintaining fluid pressure in the cylinder between the pistons for holding the upper piston in its elevated position.

ELMER B. THOMPSON.